May 24, 1927.

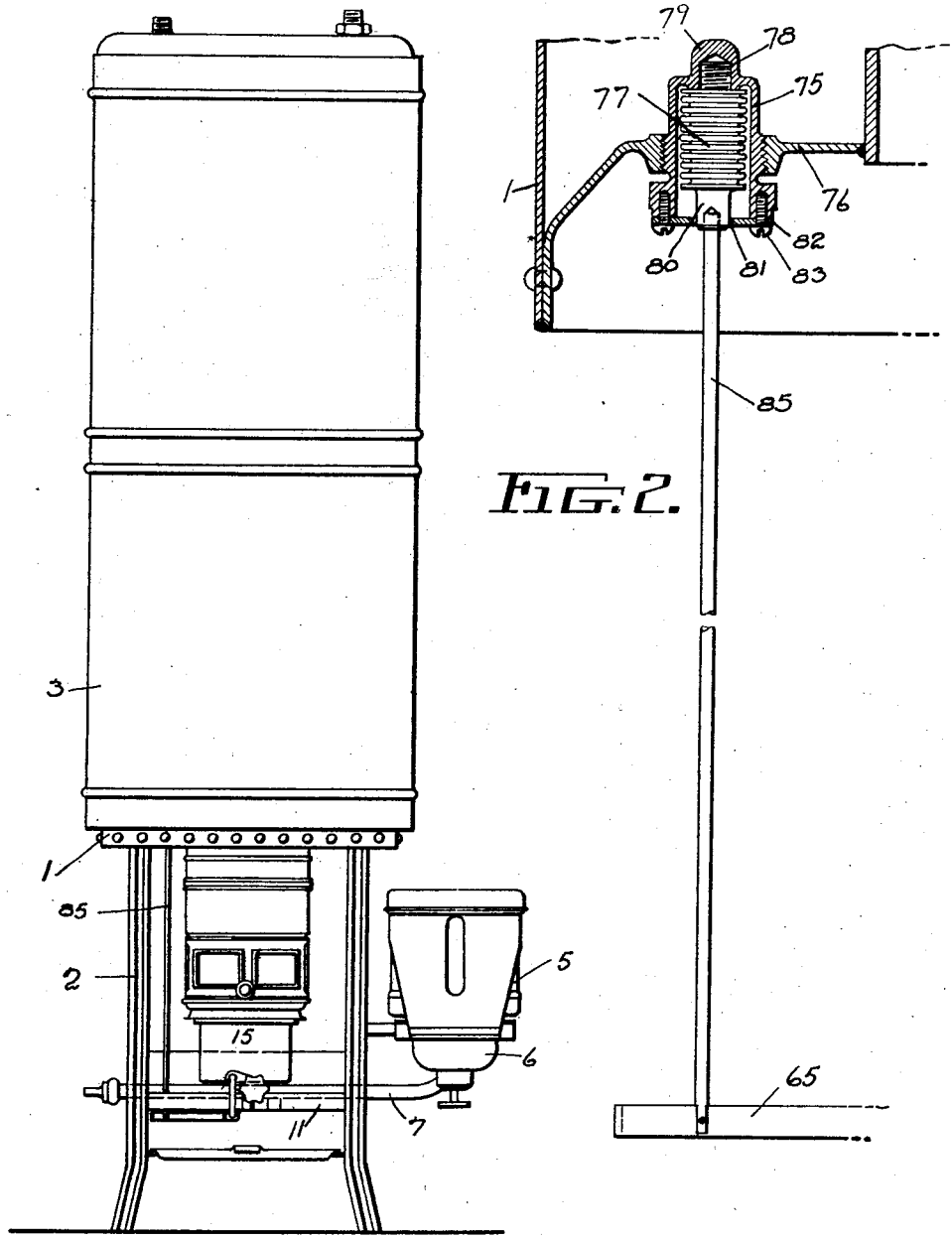

L. S. CHADWICK ET AL 1,629,569

THERMOSTATIC CONTROL FOR OIL BURNERS

Filed Sept. 26. 1923    4 Sheets-Sheet 2

INVENTORS
Lee S. Chadwick
BY
J. Alger Dahlstrom
Hull, Brock West
ATTORNEY

May 24, 1927. 1,629,569
L. S. CHADWICK ET AL
THERMOSTATIC CONTROL FOR OIL BURNERS
Filed Sept. 26, 1923 4 Sheets-Sheet 3
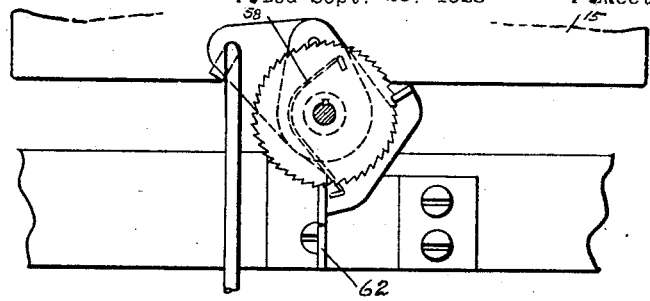
Fig. 5.
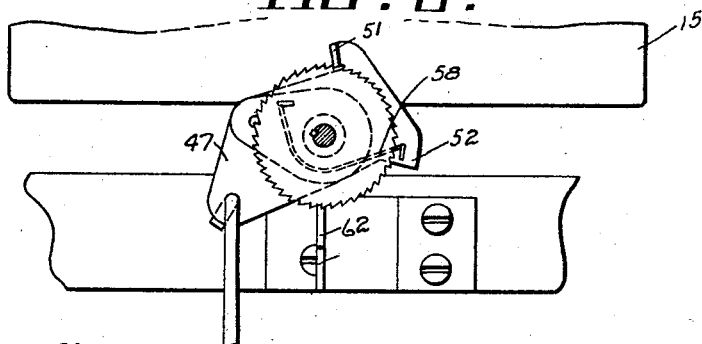
Fig. 6.
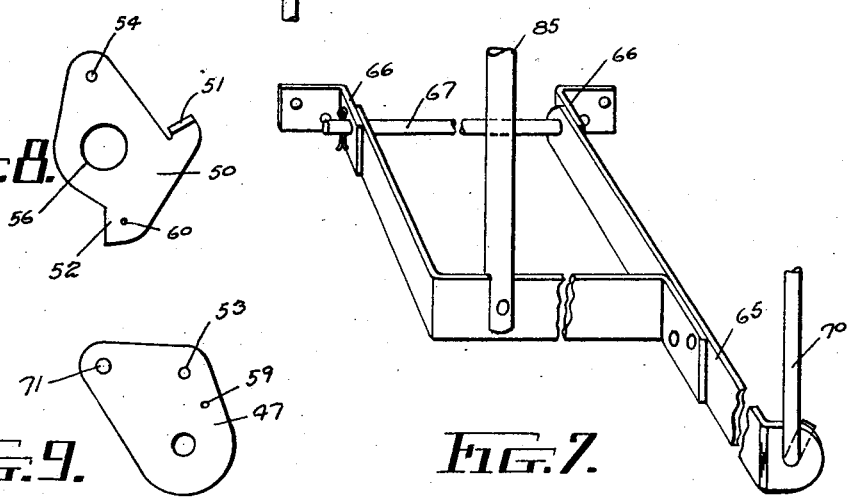
Fig. 8.
Fig. 9.
Fig. 7.
INVENTORS.
Lee S. Chadwick
BY
ATTORNEY May 24, 1927.  L. S. CHADWICK ET AL  1,629,569
THERMOSTATIC CONTROL FOR OIL BURNERS
Filed Sept. 26, 1923     4 Sheets-Sheet 4

INVENTORS
Lee S. Chadwick
Marc Resek
BY J. Alger Dahlstrom
Hull, Brock & West
ATTORNEY Patented May 24, 1927.

1,629,569

UNITED STATES PATENT OFFICE.

LEE S. CHADWICK, OF SHAKER HEIGHTS VILLAGE, MARC RESEK AND JOHN ALGER DAHLSTROM, OF EAST CLEVELAND, OHIO, ASSIGNORS TO PERFECTION STOVE COMPANY, OF CLEVELAND, OHIO, A CORPORATION OF OHIO.

THERMOSTATIC CONTROL FOR OIL BURNERS.

Application filed September 26, 1923. Serial No. 664,855.

This application is a companion to one bearing Serial No. 664,854, filed concurrently herewith by the same applicants and entitled "Thermostatic control for heating devices", and like said application it relates particularly to thermostatic means for automatically adjusting the wicks of oil burners.

The present invention is restricted to means of the aforesaid character that operates to gradually turn down the wick through the direct action of a thermostat, thus distinguishing from the species disclosed in the companion application and which utilize spring means, or the equivalent thereof, for turning down the wick, while the thermostat is employed for releasing the spring means.

The objects of the present invention are to provide simple and efficient means for automatically controlling the heat of a wick type liquid fuel burner, and which requires little attention, is thoroughly dependable, and does not interfere with the usual manual adjustment of the wick under normal conditions.

The invention is especially suitable for use in connection with water heating apparatus for controlling an oil burner by which the apparatus is fired. For this reason we have herein shown the invention associated with water heating apparatus, but with no intention of thus limiting it to such use. The invention is applicable to numerous situations where it is desired to automatically control the heat of an oil burner by means of a thermostat.

Figure 3:
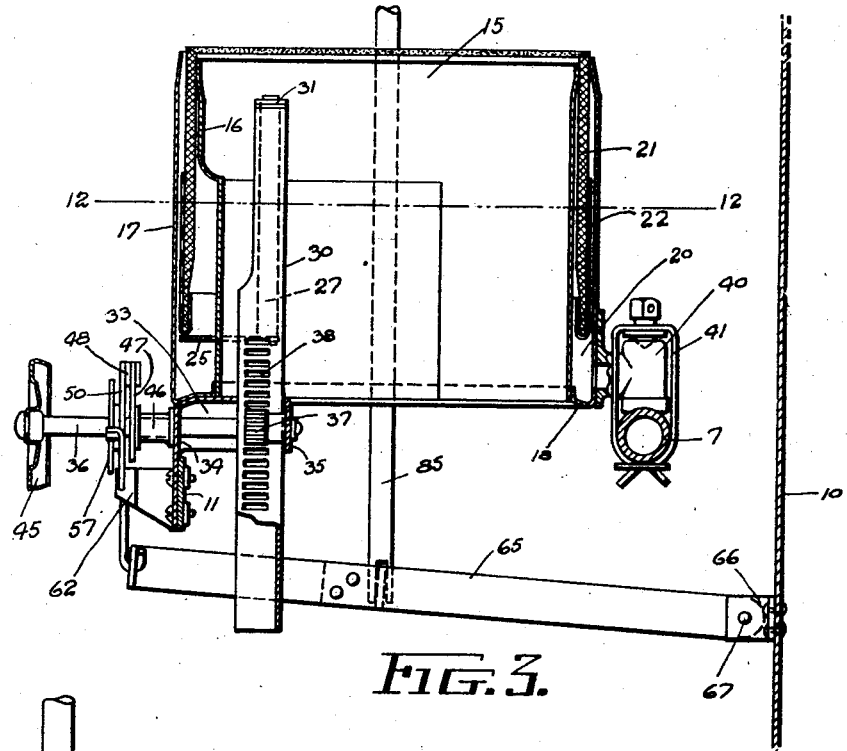
Figure 4:
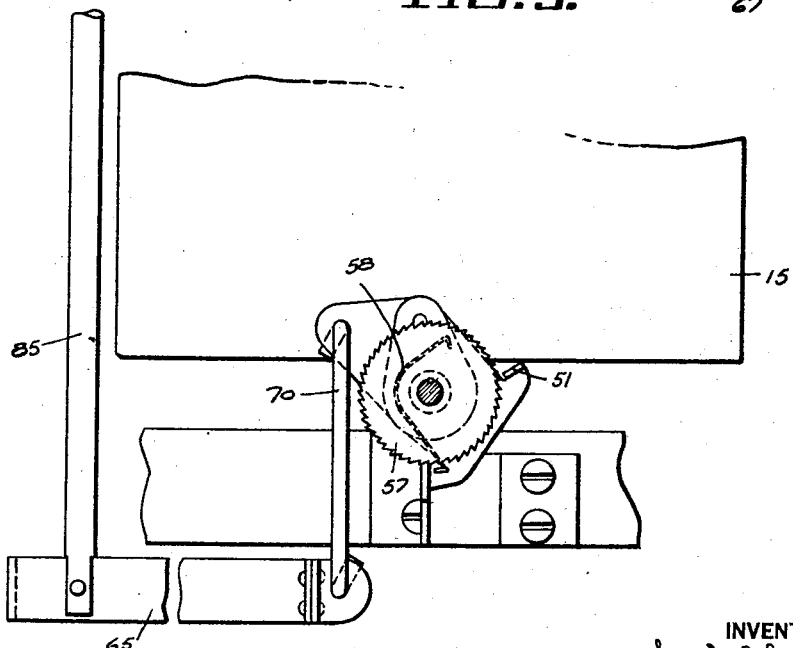
Figure 10:
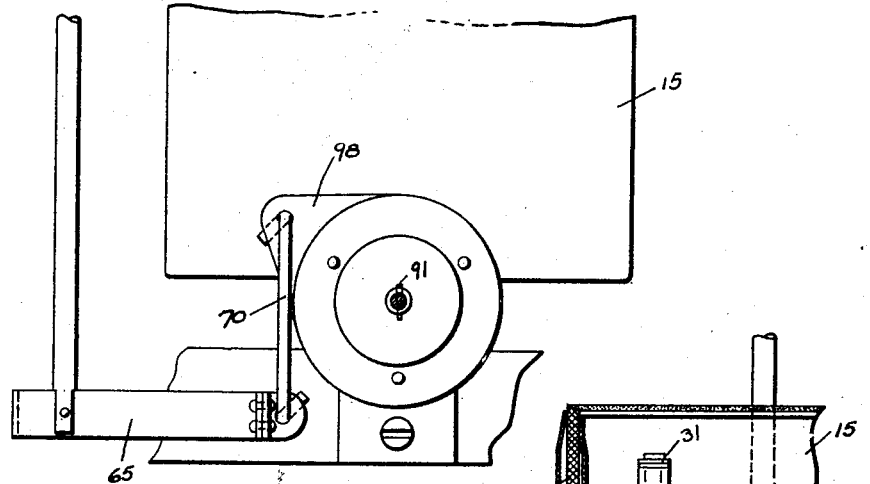
Figure 11:
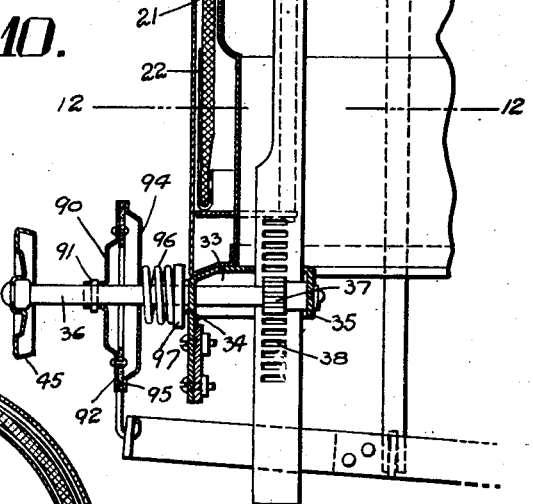
Figure 12:
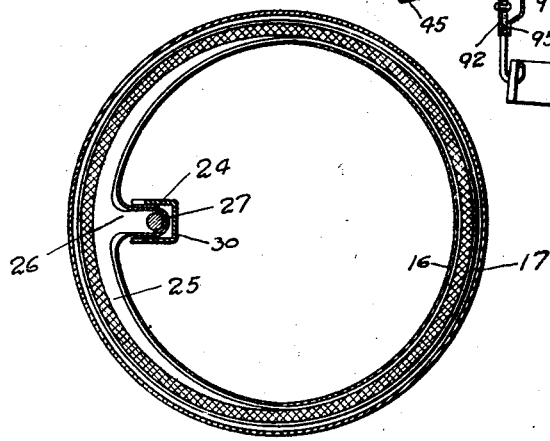

The objects already mentioned, with others hereinafter appearing, are attained in the embodiments of the invention illustrated in the accompanying drawings wherein Fig. 1 is a front elevation of a water heating apparatus incorporating the invention; Fig. 2 is a sectional detail including a part of the water container and showing the thermostat and parts of the connections between it and the wick adjusting means; Fig. 3 is an enlarged substantially central vertical section from front to rear through the burner and parts of the stand of the water heating apparatus; Fig. 4 is a fragmentary front elevation of the burner, with the wick adjusting spindle in section and showing the connections between the thermostat and spindle in ineffective condition; Fig. 5 is a view, somewhat similar to Fig. 4, showing the connections between the thermostat and spindle in effective condition but as they would appear before the thermostat had acted enough to rotate the spindle; Fig. 6 shows the parts of Fig. 5 as they would appear when advanced through a considerable range of movement by the thermostat; Fig. 7 is a perspective view of the lever involved in the operative connections between the thermostat and the wick adjusting means; Figs. 8 and 9 are, respectively, details of the actuator, and of the carrier therefor; Fig. 10 is a fragmentary front elevation of a burner incorporating a modified form of the invention; Fig. 11 is a fragmentary central vertical section through the burner shown in Fig. 10; and Fig. 12 is a horizontal section through the burner, the plane of section being indicated by the lines 12—12 of Figs. 3 and 11.

The water heating apparatus, shown in Fig. 1 consists of a water container 1, supported a suitable distance from the floor by a stand 2, and enclosed by a jacket 3. It may be the same as that which constitutes the subject matter of an application filed on even date herewith by two of the present applicants, Chadwick and Resek, and entitled "Water heating and storage apparatus". An oil reservoir 5 is supported by, and to one side of, the stand 2 in a position to discharge into a distributing receptacle 6 which is communicatively connected to a pipe 7 that leads through the lower portion of the stand 2 and is secured rigidly thereto by suitable means. The stand includes a back panel 10 and a cross member 11, the latter extending transversely of the front portion of the stand and being substantially parallel to the pipe 7 which, as will be seen in Fig. 3, is near the back panel 10.

An oil burner is indicated at 15 and it is made up of inner and outer wick tubes 16 and 17 that are joined together at their lower ends by an annular wall 18 thereby to enclose a wick space 20 containing a tubular wick 21 that is shown as equipped with the usual carrier 22. By referring to Fig. 12 it will be seen that the inner wick tube 16 has a reentrant portion 24. This reentrant portion extends in a vertical direction along the front side of the tube from the bottom to within a suitable distance of the top thereof. It will also be observed that the inner wick tube is spaced further from the outer wick tube throughout the front portion of the burner than it is throughout the rear portion. A wick elevator 25 occupies the enlarged space thus provided and to it is connected, by suitable means, the carrier 22 of the wick. For detail information as to how the wick carrier is attached to the wick elevator, reference may be had to the application of Lee S. Chadwick, Serial No. 528,813, filed January 12, 1922. An arm 26 of the wick elevator extends rearwardly into the reentrant portion 24 of the inner wick tube and there has connected to it the lower end of a rod 27 which is disposed vertically of the reentrant portion and projects through the top wall thereof. A rack member 30 of channel formation embraces the reentrant portion 24 and has its upper end connected at 31 to the top of the rod 27. A bracket 33 is secured to the front lower portion of the burner and the rack member is guided through an aperture in a rearwardly extending portion of the bracket. Journaled within apertures in the front and rear branches 34 and 35, respectively, of the bracket 33, is a spindle 36 which has secured to it, adjacent its rear end, a pinion 37 that is arranged to mesh with a rack 38 produced by forming a series of holes or slots in one of the side flanges of the rack member. The burner is supported through the front branch 34 of the bracket 33 from the cross member 11 of the stand 2, and through an elbow fitting 40, that is attached to the lower rear portion of the outer wick tube 17, from the supply pipe 7, the elbow fitting being secured by a clamp 41 to the pipe and providing communicative connection between the wick space 20 and the pipe, all of which is according to common and well known practice.

From the foregoing description it will be seen that when the spindle 36 is rotated, as by a hand wheel 45 that is fixed to its forward end, the wick 21 will be vertically adjusted by reason of its connection with said spindle through its carrier 22, the wick elevator 25, rod 27, rack member 30 and pinion 37.

Rotatably mounted upon the spindle 36, a suitable distance forwardly of the front branch 34 of the bracket 33, from which it is spaced by a sleeve 46, is a carrier 47, shown in detail in Fig. 9, the same being in the nature of a plate. Slightly spaced from and pivoted to the carrier 47, through a pivot member 48, is an actuator 50 which incorporates a pawl 51 and a stop 52. The actuator is shown in detail in Fig. 8. The holes in the carrier 47 and actuator 50 through which the pivot member 48 is engaged are designated, respectively, 53 and 54. The actuator has an opening 56 that is considerably larger than the cross sectional dimension of the spindle 36 and through which the spindle extends, and due to this the actuator is capable of both a rotary and lateral motion with respect to the spindle.

A ratchet wheel 57 is secured to the spindle 36 forwardly of the actuator 50 and its teeth are adapted to be engaged by the pawl 51 when the actuator is moved with respect to the carrier 47 by a wire spring 58 which has its ends engaged through holes 59 and 60 of the carrier and actuator, respectively. Extending forwardly from the cross member 11 in substantially the vertical plane of the spindle 36 is an abutment 62 that is adapted to be engaged by the stop 52 of the actuator.

The rear ends of substantially parallel branches of a forked lever 65 are disposed between lugs 66 that project forwardly from the rear panel 10 of the stand 2, and a pintle 67 extends through registering apertures in the branches and ears thereby to provide a pivotal support for the lever. At its forward end the lever 65 is connected through a link 70 with the carrier 47, the opposite ends of said link being formed to provide hooks which are engaged through holes in the lever and carrier, the hole of the carrier being designated 71 in Fig. 9.

As will be seen by reference to Fig. 2, a housing 75 is screwed upwardly through the bottom wall 76 of the water container 1, and housed therein is a thermostat 77. This thermostat is in the nature of a metal bellows which contains a fluid susceptible to temperature changes and when heated expands and elongates the bellows. At one end the bellows is provided with a threaded stud 78 that is screwed into an internally threaded hollow boss 79 of the housing 75, and at its opposite end has an extension 80 which protrudes through an opening 81 in a closure 82 that is shown as secured by screws 83 to the bottom of the housing. A rod 85 is interposed between the extension 80 of the thermostat and a part of the lever 65 to which it is loosely connected.

When the thermostat 77 is in normal condition and unaffected by the temperature of the water within the container 1, the lever 65 will be held with its forward end elevated sufficiently to maintain the carrier 47, by reason of its connection therewith through the link 70, in a position to hold the stop 52 of the actuator against the abutment 62 and the pawl 51 out of engagement with the teeth of the ratchet wheel 57, the parts being illustrated in such condition in Fig. 4. With the parts in this condition the spindle is free to be manually rotated to adjust the wick. As soon as the thermostat is elongated to a very slight degree by the necessary rise in temperature of the water within the container 1, the forward end of the lever 65 will be depressed and the carrier relaxed so that the spring 58 may effect the necessary movement of the actuator with respect to the carrier to project the pawl 51 into engagement with a tooth of the ratchet 57, as illustrated in Fig. 5. Further elongation of the thermostat will materially depress the forward end of the lever 65, causing the carrier to be rotated upon the spindle 36 in a counter-clockwise direction and for a distance dependent upon the extent to which the thermostat is elongated. During the rotation of the carrier, the actuator, through the pawl 51, will transmit the movement of the carrier to the spindle thereby to lower the wick. As the water within the container cools and the thermostat contracts the lever 65 will be swung upwardly, as will also the carrier 47, thereby to return the parts to their former positions.

In the modification illustrated in Figs. 10 and 11 there is a frictional driving connection between the thermostat and the spindle. A disk 90 is secured to the spindle 36, as by means of a pin 91, a distance inwardly of the handwheel 45, and an annulus 92 of suitable friction material is secured to the edge portion of the disk. A pressure plate 94 is rotatably mounted upon the spindle 36 adjacent the disk 90 and an annulus portion 95 thereof bears against the annulus 92. A coil spring 96 surrounds the spindle 36 and is compressed between the pressure plate 94 and a collar 97 that is applied to the spindle adjacent the front branch 34 of the bracket 33. A lateral extension 98 of the pressure plate is connected, through the link 70, with the lever 65.

In the present modification, the spindle 36 is at all times subjected to the action of the thermostat while, at the same time, it may be manually manipulated by means of the handwheel 45, it being necessary, in such manual manipulation, to exert sufficient force over and beyond that required to operate the wick adjusting means, to overcome the frictional engagement of the friction plate 94 with the annulus 92 of the disk 90.

Having thus described our invention, what we claim is:—

1. In combination with a liquid fuel burner of the wick type, wick adjusting means involving a spindle that is rotatable in one direction to raise the wick and in the opposite direction to lower the wick, a member rotatable with the spindle, an actuator for cooperation with said member and rotatable upon the axis of the member but independently thereof, means effecting a driving connection between the actuator and said member, and operative connections between the thermostat and the actuator.

2. In combination with a liquid fuel burner of the wick type, wick adjusting means involving a spindle that is rotatable in one direction to raise the wick and in the opposite direction to lower the wick, a member rotatable with the spindle, an actuator rotatable upon the rotating axis of said member, means for effecting a driving connection between the actuator and the member, a thermostat, operative connections between the thermostat and said actuator, and means for maintaining the former means ineffective when the thermostat is in contracted condition.

3. In combination with a liquid fuel burner of the wick type, wick adjusting means involving a spindle that is rotatable in one direction to raise the wick and in the opposite direction to lower the wick, a member rotatable with the spindle, a carrier rotatable upon the axis of the member, an actuator rotatable with the carrier and shiftable laterally with respect thereto, means for effecting driving connections between the actuator and said member, further means tending to maintain said driving connections effective, a thermostat, operative connections between the thermostat and the carrier, and an abutment arranged to be engaged by a part of the actuator when the thermostat is in contracted condition and which effects a lateral shifting of the actuator with respect to the carrier thereby to render the second mentioned means ineffective.

4. In combination with a liquid fuel burner of the wick type, wick adjusting means involving a spindle that is rotatable in one direction to raise the wick and in the opposite direction to lower the wick, a member rotatable with the spindle, a carrier rotatable upon the axis of said member, an actuator pivoted to the carrier and shiftable in a lateral direction with respect to the axis of the carrier, the actuator having a part for driving connection with the aforesaid member and an abutment engaging stop, means tending to move the actuator with respect to the carrier thereby to effect a driving connection between the actuator and the member, a thermostat, operative connections between the thermostat and the carrier, and an abutment engaged by the aforesaid portion of the actuator when the thermostat is in contracted condition thereby to shift the actuator with respect to the carrier to render the driving connection between it and the member ineffective.

5. In combination with a liquid fuel burner of the wick type, wick adjusting means involving a spindle that is rotatable in one direction to raise the wick and in the opposite direction to lower the wick, a ratchet wheel rotatable with the spindle, a carrier rotatable upon the axis of the ratchet wheel, an actuator movably carried by the carrier and having a pawl for engagement with the teeth of the ratchet wheel, means tending to move the actuator so as to engage said pawl with a tooth of the ratchet wheel, a thermostat, operative connections between the thermostat and the carrier, and an abutment, said actuator having a part that is held in engagement with the abutment when the thermostat is in contracted condition thereby to maintain the actuator in a position with its pawl out of engagement with the ratchet wheel.

6. In combination with a liquid fuel burner of the wick type, wick adjusting means involving a spindle that is rotatable in one direction to raise the wick and in the opposite direction to lower the wick, a ratchet wheel secured to the spindle, a carrier mounted upon the spindle and rotatable with respect thereto, an actuator pivoted to the carrier and shiftable laterally with respect to the axis of the spindle, said actuator having a pawl for engagement with the teeth of the ratchet wheel, a spring tending to shift the actuator with respect to the carrier so as to engage its pawl with a tooth of the ratchet wheel, a thermostat, operative connections between the thermostat and the carrier, and an abutment, the actuator having a part arranged to engage the abutment when the thermostat is in contracted condition thereby to maintain the actuator in a position with its pawl out of engagement with the ratchet wheel.

7. In combination with a liquid fuel burner of the wick type, wick adjusting means involving a spindle that is rotatable in one direction to raise the wick and in the opposite direction to lower the wick, means for manually rotating the spindle, a thermostat, and driving connections between the thermostat and the spindle which yield to a manual operation of the spindle when the spindle is rotated in a given direction.

In testimony whereof, we hereunto affix our signatures.

LEE S. CHADWICK.
MARC RESEK.
J. ALGER DAHLSTROM.